United States Patent Office.

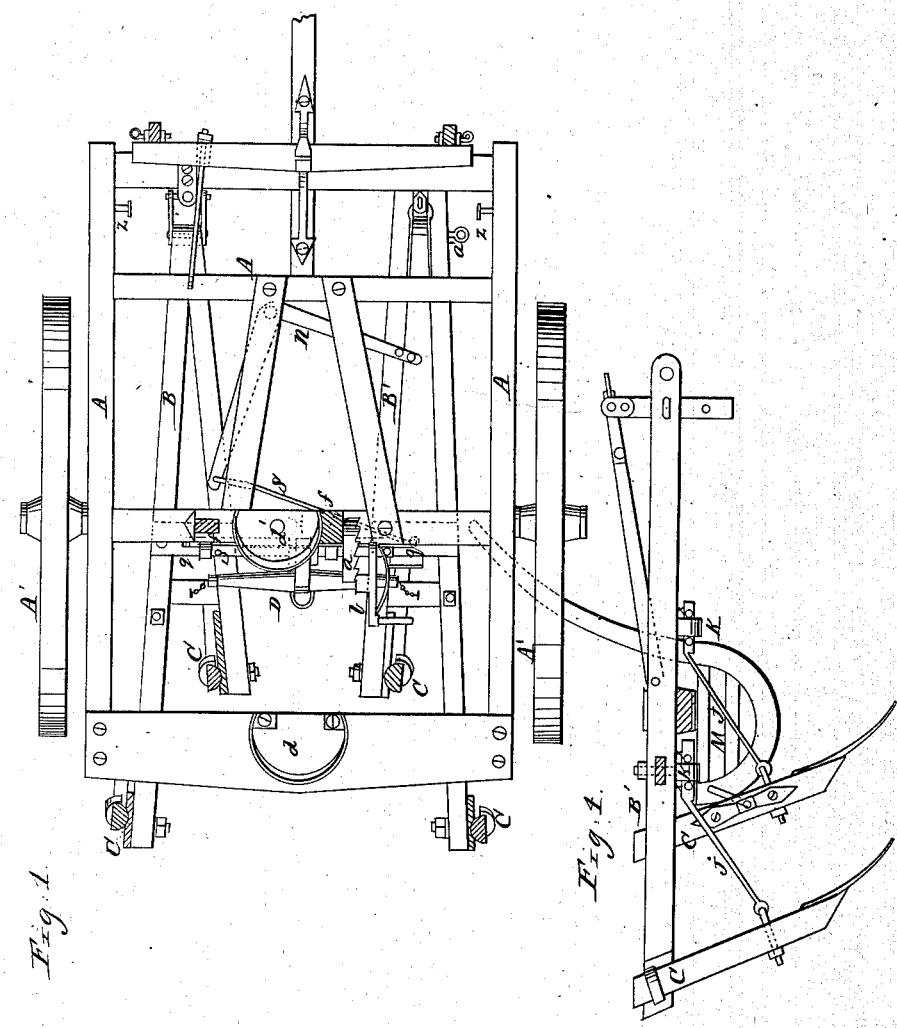

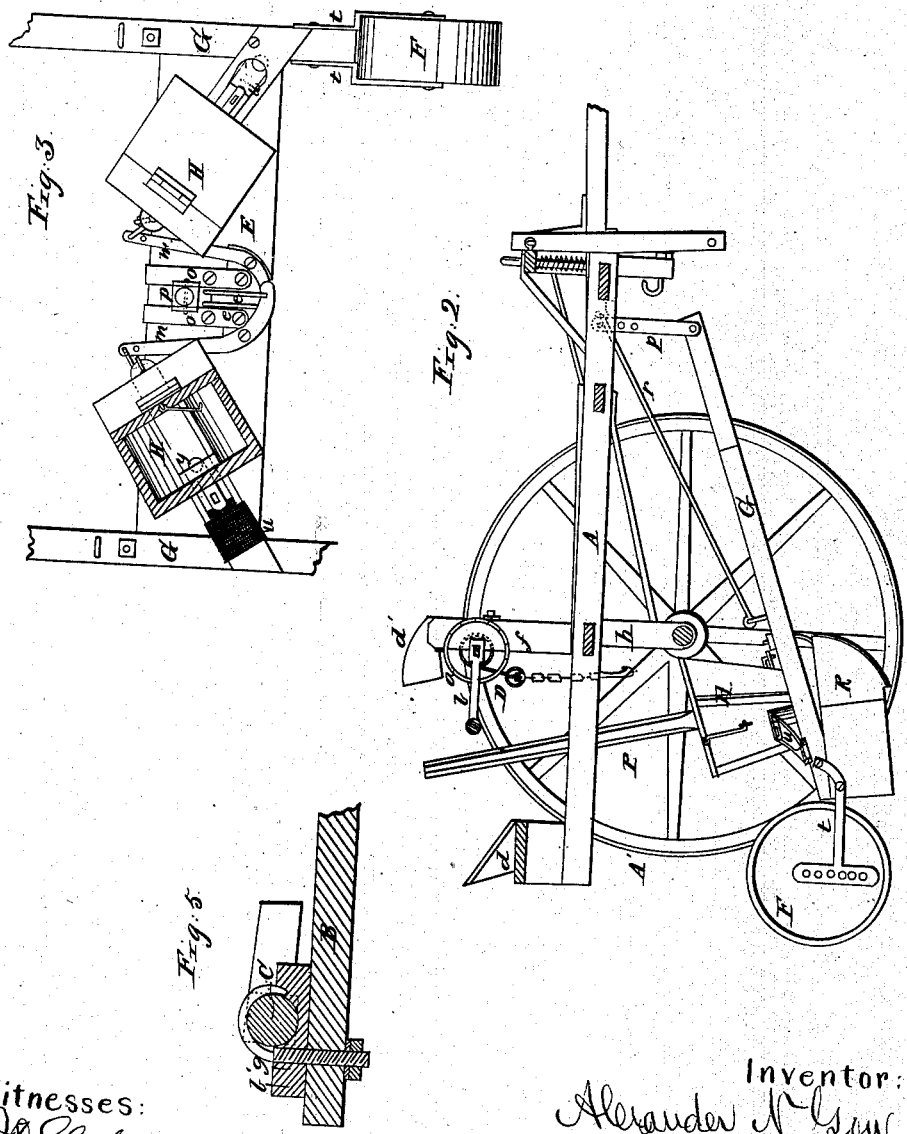

ALEXANDER N. GOW, OF MOUNT VERNON, OHIO.

Letters Patent No. 62,263, dated February 19, 1867.

COMBINED CORN PLANTER AND CULTIVATOR.

*The Schedule referred to in these Letters Patent and making part of the same.*

TO ALL WHOM IT MAY CONCERN:

Be it known that I, ALEXANDER N. GOW, of Mount Vernon, in the county of Knox, and in the State of Ohio, have invented certain new and useful improvements in Combined Corn Planter and Cultivator, and do hereby declare that the following is a full, clear, and exact description thereof, reference being had to the accompanying drawings, and to the letters of reference marked thereon.

Figure 1 represents a plan view of the frame, with cultivator attached.

Figure 2, a longitudinal section of the frame, with corn planter attached.

Figure 3, a plan view of the corn planter.

Figure 4, a side view of the cultivator beams and ploughs.

Figure 5, the mode of attaching the uprights to the beam in the cultivator.

My invention consists in the construction of a suitable sulky for attaching either the cultivator or corn planter, and substituting the one for the other; also, in the construction of the cultivator devices; also, in the construction of the corn planter for planting two rows at one time.

In the annexed drawings, A represents the sulky frame, which is composed of two horizontal pieces of timber, with suitable cross-pieces for firmly connecting the same together. This frame rests upon a metallic axle, ($h$, fig. 2,) so bent as to elevate the frame above the line with hubs of the wheels A' A'. Secured upon the stay of the frame A, above the axle, are two small uprights, $f$, connected at their tops with a seat, $d'$, formed thereon. Attached to the rear of this small frame is the windlass D for elevating or lowering the cultivator beams. This windlass is composed of a rod, $s$, with a belt or cord connecting it to a bar, having a chain at each end, which is secured to each of the cultivators, and is operated by a lever, $b$, with a spring for securing it within one of the notches on the wheel $a$, which is placed upon the end of bar $s$. B B' represent the frames composing the cultivator. Each of these frames is attached, by means of loops and pins or other suitable devices, to the forward end of the frame, and so secured that it may be easily detached therefrom. Frame B is composed of a long and short beam, connected together at the forward end and separated slightly at the rear, for the purpose of cultivating the earth, as will be hereinafter set forth. Frame B' is composed of a long and short beam also, and with an intermediate bar, with a clevis, by which it is attached to the frame A. This bar has two metallic ears near the swivel, which connect a small piece of wood, with perforations for connecting the beams, by means of the pin $a'$, at any desired distance below the frame A, thereby regulating the depth of the shovels for penetrating the earth. At the rear end of each beam composing the frames B B', is an upright bar, C, to which a shovel is attached. These bars are placed ordinarily at an angle, and beside their connections at the top, are each provided with a rod, J, flattened at the front end, and perforated, $x\ x\ x$, for passing through a loop, K, under the beams, so that the angle desired for the ploughs may be regulated by these rods. These bars C are connected to the beams at their tops by means of a hook, $g$, with a thread upon the straight portion. This hook passes through the beam, (see fig. 5,) and a concaved block $b'$, and around the top of the bar C, where the end of said hook clamps into the block, the whole being secured by a nut outside of the beam. M represents the guard, which is suitably hinged to one of the inner beams of the cultivator frame. This guard is for the protection of the small corn as the shovels pass at the sides thereof. This guard is composed of a curved metal bar extending up within reach of the operator, and a series of plates to prevent the lumps from rolling against the corn. Under the small frame $f$, near the axle-bar, is a rod, bent with both ends down. This rod passes through small plates in each frame B B', and is connected by a short rod, $s$, to a knee-lever, $n$. This lever is pivoted at the bend to one of the forward braces of the frame A, and is for the purpose of shifting the cultivator frames B B' either to the right or to the left. The corn-planter attachment is composed of two side-rails, G G, with roller F F at their ends, and connected by a board, E, upon which rest the seed-boxes H. The forward ends of the rails G are each provided with a metal plate, $p$, which connects to a stud, $z$, upon the frame A. Said rails have also suitable metal rods, $r$, for additionally connecting the corn planter to the frame, as seen in fig. 1. Any suitable mode of connection may be used. The seed-boxes H are placed near the rails G, and are each provided with a seed-spout, which extends to the rear directly forward of the rollers F. Each box is provided with two seeders, one above a dividing block in the seed-box, and the other below. The opening in the upper seeder carries the seed into the spout $u$, where it is there carried through the spout, and falls through an opening near the ends of the rails G, by the lower seeder. Each of the spouts is covered by a wire screen, to shield the seed from foreign substances and cause it to pass through the channel intended, while within each seed-box is a small rubber block, $y$, near the opening, to cause the regularity in the distribution of the seed. Between the boxes H is placed the shaft P, which operates the seeders. This shaft is pivoted in an upright position between two metal ears, $o\ o$, and is connected by means of two rods $e\ e$ to horizontal bent arms, $m\ m$, which connect the two seeders in each box, and cause them to operate together. The shaft P extends up above the frame in front of the rear seat $d$, where it is worked, and, by means of said arms, operates the seeders. R represents the furrow openers, which are secured under the rails G, in front of the rollers F. These furrow openers are composed of two sheets of metal each, rounded and connected at front, as shown, and open in the rear for the seed to pass between as it falls through the opening at the end of the spout. They may be adjusted by means of the arms $t$, which regulate the rollers.

In using the frame for cultivating, the frames B and B are attached by means of the devices herein set forth, or other suitable means, with the operator occupying the front seat $d'$; and whenever the corn is intended to be planted, the device herein described is secured, and the operator occupies the rear seat $d$, for handling the shaft P.

Having thus fully described my invention, what I claim as new, and desire to secure by Letters Patent, is—

1. The frame A, axle $h$, windlass D, with cultivator frames B and B', all constructed, arranged, and used as herein fully described.

2. The hook $g$, when constructed as described, and used for connecting the shovel-bars to the beams by means of the block $b'$, as herein set forth.

3. The guard M, as constructed and used for the purposes set forth.

4. The arrangement of the lever $n$ with rod $s$ and rod $q$, for shifting the cultivators, when used in the manner and for the purposes specified.

5. The arrangement of the bars C with their adjustable braces J, as constructed, in combination with the frames B B', when used as and for the purposes set forth.

6. The arrangement of the rails G with the board E, rollers F F, and seed-boxes H H, in the manner and for the purposes set forth.

7. The shaft P, arms $m\ m$, and rods $e\ e$, for operating the seeders, when arranged as specified.

8. The seed-boxes H H, with spouts $u\ u$, all constructed and operating as herein set forth.

9. The arrangement of the furrow openers R, rollers F, and arms $t$, with the seed-boxes H H, with their spouts $u\ u$, rubber blocks $y$, and screws $w$, when constructed as herein described, and used as specified.

In testimony that I claim the foregoing, I have hereunto set my hand this 12th day of December, 1866.

ALEXANDER N. GOW.

Witnesses:
C. M. ALEXANDER,
J. M. MASON.